United States Patent [19]
Satou

[11] Patent Number: 5,572,479
[45] Date of Patent: Nov. 5, 1996

[54] SEMICONDUCTOR INTEGRATED CIRCUIT HAVING A SYNCHRONOUS TYPE MEMORY

[75] Inventor: Mitsugu Satou, Itami, Japan

[73] Assignee: Mitsubishi Denki Kabushiki Kaisha, Tokyo, Japan

[21] Appl. No.: 548,068

[22] Filed: Oct. 25, 1995

[30] Foreign Application Priority Data

Mar. 6, 1995 [JP] Japan ................................ 7-045520

[51] Int. Cl.⁶ .............................. G11C 7/00; G11C 8/00
[52] U.S. Cl. .......................... 365/230.06; 365/230.08; 365/233; 365/203
[58] Field of Search ..................... 365/230.06, 230.08, 365/233, 203

[56] References Cited
FOREIGN PATENT DOCUMENTS 2-172094  7/1990  Japan .

*Primary Examiner*—David C. Nelms
*Assistant Examiner*—Trong Phan
*Attorney, Agent, or Firm*—Lowe, Price, LeBlanc & Becker

[57] ABSTRACT

A semiconductor integrated circuit includes an instruction execution controlling division which stops the execution of an instruction by stopping the renewal of a control signal in response to a signal representing that the instructing executing division is not prepared for receiving a control signal instructing the execution of the instruction or a signal representing that the decoded result of the instruction is invalid.

11 Claims, 10 Drawing Sheets

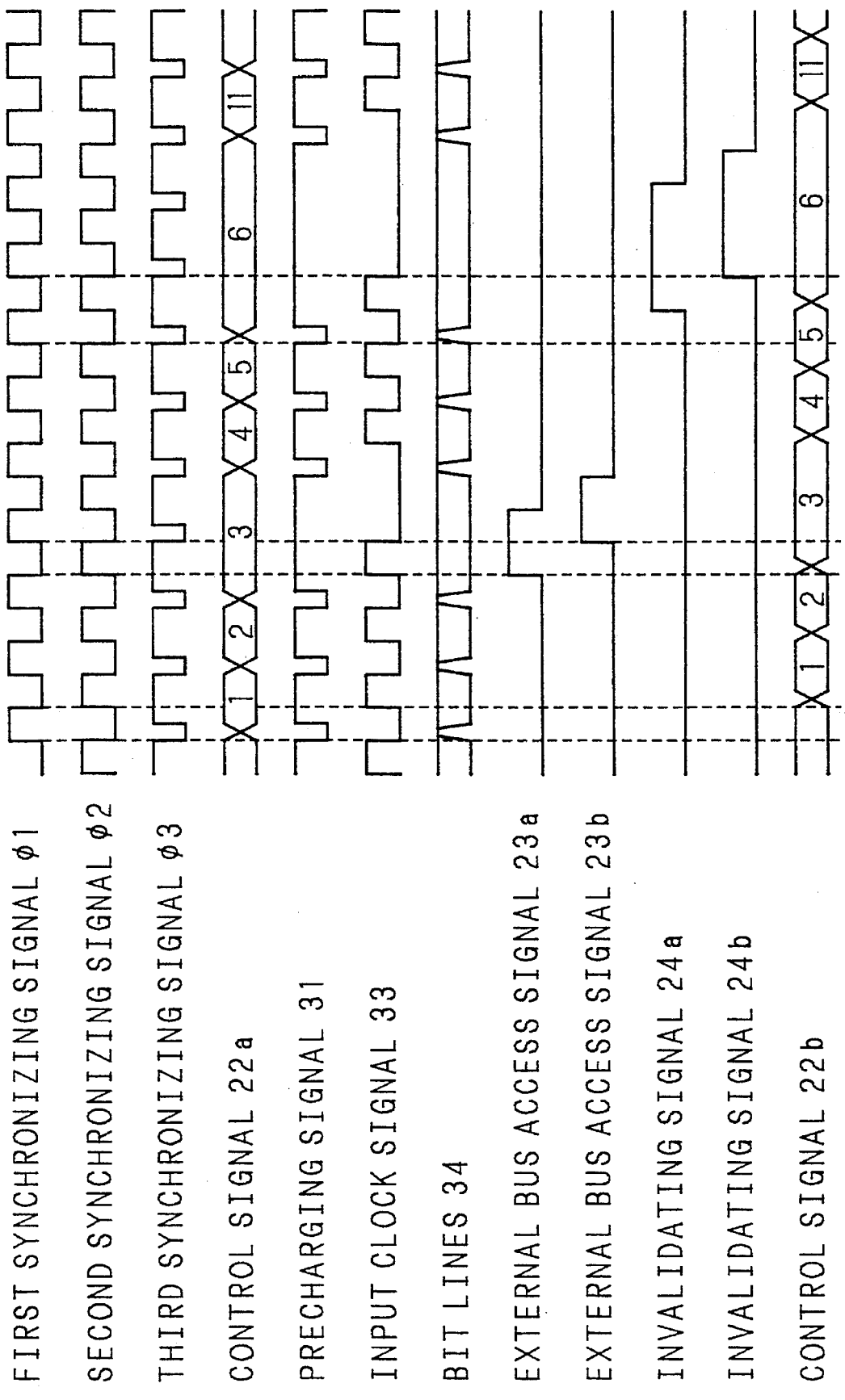

SEMICONDUCTOR INTEGRATED CIRCUIT HAVING A SYNCHRONOUS TYPE MEMORY

BACKGROUND OF THE INVENTION

1. Field of the Invention

The present invention relates generally to a semiconductor integrated circuit, and more particularly to a semiconductor integrated circuit having a synchronous type memory for controlling the execution of instructions.

2. Description of Related Art

In recent years, a high-speed handling, energy saving and compact size are in strong demand for the semiconductor integrated circuits.

FIG. 1 is a block diagram showing the structure of a semiconductor integrated circuit having a synchronous type memory division, which is disclosed in Japanese Patent Application Laid-Open No. 2-172094 (1990). The synchronous type memory division 4 includes a two-port RAM, and executes the performances of precharging bit lines, driving word lines, and operating a sense amplifier in each machine cycle by using a four-phase clock generated by an all-purpose acoustic signal processor. A first control circuit 1 is provided for each bit line for a first address signal address AD1, and the first address signal AD1 and a first synchronizing signal SS10 and a second synchronizing signal SS20 are inputted to the control circuit 1.

The second synchronizing signal SS20 is also inputted to one of the input terminals of an AND gate 2. The first control signal SC1 outputted from any of the control circuits 1 is inputted to an OR gate 3 having several input terminals as part of the second control circuit, and the output thereof is inputted to the other input terminal of the AND gate 2 as part of the second control circuit. The second control signal SC2 outputted from the AND gate 2 is inputted to the synchronous type memory division 4 which outputs a data DT. The second address signal AD2 outputted from the control circuit 1 is inputted to the synchronous type memory division 4. This prior art semiconductor integrated circuit does not read a series of data and continues to output an output data for the address signals if the address signal inputted remains the same throughout several machine cycles.

FIG. 2 is a circuit diagram showing the internal structure of the control circuit 1. There are connected a first register 5, a second register 6, and a third register 7 and an XOR gate 8. The first register 5 receives the first synchronizing signal SS10 and the first address signal AD1, and outputs signals to one of the input terminals of the second register 6 and XOR gate 8. The second register 6 receives the second synchronizing signal SS20, and outputs a second address signal AD2 which is then inputted to the third register 7. The third register 7 receives the first synchronizing signal SS10 and the second address signal AD2, and outputs a signal to the other input terminal of the XOR gate 8 which outputs the first control signal SC1.

FIG. 3 is a block diagram showing the internal structure of the synchronous type memory division 4 of FIG. 1. The synchronous type memory division 4 includes an X decoder 9, a Y decoder 10, a Y selector 11, a bit-line precharging circuit 50, a memory cell array 12 and an output circuit 13. Each bit of the second address signal AD 2 is inputted to the X decoder 9 and the Y decoder 10. The second control signal SC2 is inputted to the X decoder 9 and the bit-line precharging circuit 50 which is connected to the memory cell array 12 through each bit line BL. The X decoder 9 is connected to the memory cell array 12 through each word line WL. The Y selector 11 is connected to the memory cell array 12 through each bit line BL. The Y decoder 10 inputs a decoding signal SDC to the Y selector 11. The Y selector 11 is also connected to the output circuit 13 which outputs an output data DT.

The semiconductor integrated circuit is operated as follows:

The first address signal AD1 is held by the first register 5, and the data held by the first register 5 is held by the second register 6 synchronously with the second synchronizing signal SS20. The data in the second register 6 is held by the third register 7 synchronously with the first synchronizing signal SS10. The data in the second register 6 is outputted as the second address signal AD2. The data in the first register 5 and in the third register 7, that is, the data held by the first register 5 one cycle before establish an exclusive-or operation at the XOR gate 8, and the XOR gate 8 outputs the first control signal SC1 representing that the addresses in the present cycle and the previous (one cycle before) cycle are in agreement or not. At this stage, the first control signal SC1 becomes H-level when discord is found in data, and becomes L-level when accord is found in data. The first control signal SC1 from one of the control circuits 1 is inputted to the OR gate 3, and the second synchronizing signal SS20 and an output from the OR gate 3 establish a logical sum of the AND gate 2. As a result, only when the first address signal AD1 is different between the present cycle and the previous (one cycle before) cycle, the second control signal SC2 is inputted to the synchronous type memory division 4 synchronously with the second synchronizing signal SS20. The second address signal AD2 outputted from one of the control circuits 1 is directly inputted to the synchronous type memory division 4. The synchronous type memory division 4 reads a series of data only when the second control signal SC2 synchronous with the synchronizing signal SS20 is inputted (at H-level), thereby keeping the first address signal AD1 unchanged. This means that when the second control signal SC2 is at L-level, no data is read from the synchronous type memory division 4.

FIG. 4 is a diagram showing the operations of signals within the synchronous type memory division 4. Machine cycles are designated by MO, M1 through M5 which divides the operation of the synchronous type memory division 4 event by event. The second address signal AD2 to be inputted to the synchronous type memory division 4, that is, the data in the second register 6 changes with each machine cycle MO, M1, M4 and M5, and does not change in the machine cycles M2, M3 and M4. The first control signal SC1, which represents the accord and discord between the data held in the present cycle and in the previous (one cycle before) cycle, becomes L-level synchronously with the first synchronizing signal SS1O in the machine cycle M2, and becomes H-level synchronously with the first synchronizing signal SS1O in the machine cycle M4. The second control signal SC2, which is a synchronizing signal of the synchronous type memory division 4, is maintained at L-level during the period of time from the machine cycles M3 to M4, so that during this period of time the electric potential of the bit lines BL and the word lines WL remains the same and continue to output the data (D) or (C) in the machine cycle M2. As a result, during the machine cycles M3 and M4, the synchronous type memory division 4 does not read a series of data for precharging the bit lines BL, driving the word lines WL, discharging the bit lines, and operating a sense amplifier.

The aforementioned are the operations of reading data followed by the synchronous type memory division 4, and the same operations are followed when data is written.

The known semiconductor integrated circuit has the structure described above, and if electricity is to be saved by prohibiting the reading of a series of data which would otherwise be performed by the synchronous type memory division, a special arrangement is required for effecting the comparison of addresses. More specifically, each bit requires a three-stage of address registers to hold memory addresses, and a comparator is additionally required to compare the outputs of the first register 5 and third register 7, thereby resulting in an increased number of hardwares in the circuit. As a result, the production cost is increased and the chip area becomes enlarged against the expected ideal of compact size.

There is a data processor such as a microprocessor utilizing a pipe line structure which is equipped with the synchronous type memory division in the instruction execution control division, that is, a μ ROM. This type of known device has the following disadvantages:

However, the address comparison system referred to above is not effective to save electric current for the following reasons:

For example, an instruction fetch stage (hereinafter referred to as "IF stage"), a decoding stage (hereinafter referred to as "D stage"), a μ-code reading stage (hereinafter referred to as "R stage"), and an execution stage (hereinafter referred to as "E stage") are constructed in this order. These stages are operated in parallel. In this pipe line structure, when a branch instruction is to be executed, it is in the D stage when it is found to be a branch instruction, and when this instruction is decoded, an instruction following the branch instruction (which invalidates the operation in the pipe line) is fetched from an external memory in parallel in the IF fetch stage. This invalid instruction is specially prohibited from performing in the E stage, wherein the "special prohibition" means that if, for example, it is an instruction for directing the writing of data in the register, a prohibiting signal is delivered to the E stage so as to prevent the writing of data into the register. However, in the synchronous type memory division in the R stage the reading of data from the μ ROM is nevertheless performed on the basis of the invalid instruction, thereby wasting electricity in reading data from the μ ROM.

SUMMARY OF THE INVENTION

The present invention is directed to solve the problems discussed above, and it is an object of the present invention to provide a semiconductor integrated circuit including a synchronous type memory division but less hardware so as to ensure that less electric power is consumed.

According to one aspect of the present invention, there is provided a semiconductor integrated circuit which includes an instruction decoding division for decoding an instruction, an instruction execution controlling division for generating a control signal controlling the execution of the instruction on the basis of the decoded result in the instruction decoding division; and an instruction executing division for executing the instruction on the basis of the control signal, wherein the instruction execution controlling division includes a synchronous type memory division including word lines selectable in accordance with the decoded result, bit lines, a precharge circuit for precharging a selected bit line in response to a precharge request signal, a ground line through which the charge in the precharged bit line is discharged, and a memory cell for generating the control signal, the memory cell being connected to the word lines, the bit lines and the ground line and includes a precharge control division for generating the precharge request signal, and stopping the generation of the precharge request signal in response to a prohibiting signal representing that the instruction executing division is not prepared to receive the control signal.

According to another aspect of the present invention, there is provided a semiconductor integrated circuit which includes an instruction decoding division for decoding an instruction, an instruction execution controlling division for generating a control signal controlling the execution of the instruction on the basis of the result decoded in the instruction decoding division; and an instruction executing division for executing the instruction on the basis of the control signal, wherein the instruction execution controlling division includes a synchronous type memory division including word lines selectable in accordance with the decoded result, bit lines, a precharge circuit for precharging a selected bit line in response to a precharge request signal, a ground line through which the charge in the precharged bit line is discharged, and a memory cell for generating the control signal, the memory cell being connected to the word lines, the bit lines and the ground line and includes a precharge control division for generating the precharge request signal, and stopping the generation of the precharge request signal in response to a prohibiting signal representing that the decoded result of the instruction is invalid.

In a preferred embodiment, the precharge control division stops the generation of the precharge request signal in response to a first prohibiting signal representing that the instruction executing division is not prepared to receive the control signal and/or a second prohibiting signal representing that the decoded result of the instruction is invalid.

Because of stopping the generation of the precharge request signal, the instruction for directing the precharging of the bit lines in the synchronous type memory division is not executed.

In a preferred embodiment, the instruction execution controlling division includes a first latch control division for stopping the generation of a first latch renewal permitting signal in response to the first prohibiting signal and/or the second prohibiting signal, and a first latch division for latching a data read out from the synchronous type memory division in response to the first latch renewal permitting signal from the latch control division. Because of stopping the generation of the first latch renewal permitting signal prevents a fresh data from the synchronous type memory division from being inputted to the first latch division, and the data currently held at the latch division continues to be outputted to the instruction executing division.

In a preferred embodiment, the instruction decoding division includes a second latch control division for stopping the generation of the second latch renewal permitting signal in response to the first prohibiting signal and/or the second prohibiting signal, and a second latch division for latching the decoded result of the instruction in response to the second latch renewal permitting signal. Because of stopping the generation of the second latch renewal permitting signal, the decoded result of the instruction fresh data is not inputted to the second latch division from the instruction decoding division, and the data currently held at the latch division is outputted to the instruction execution controlling division.

The above and further objects and features of the invention will more fully be apparent from the following detailed description with the accompanying drawings.

BRIEF DESCRIPTION OF THE DRAWINGS

FIG. 10 is a timing diagram showing the operation of the semiconductor integrated circuit shown in FIG. 9.

DESCRIPTION OF THE PREFERRED EMBODIMENTS

Figure 1:
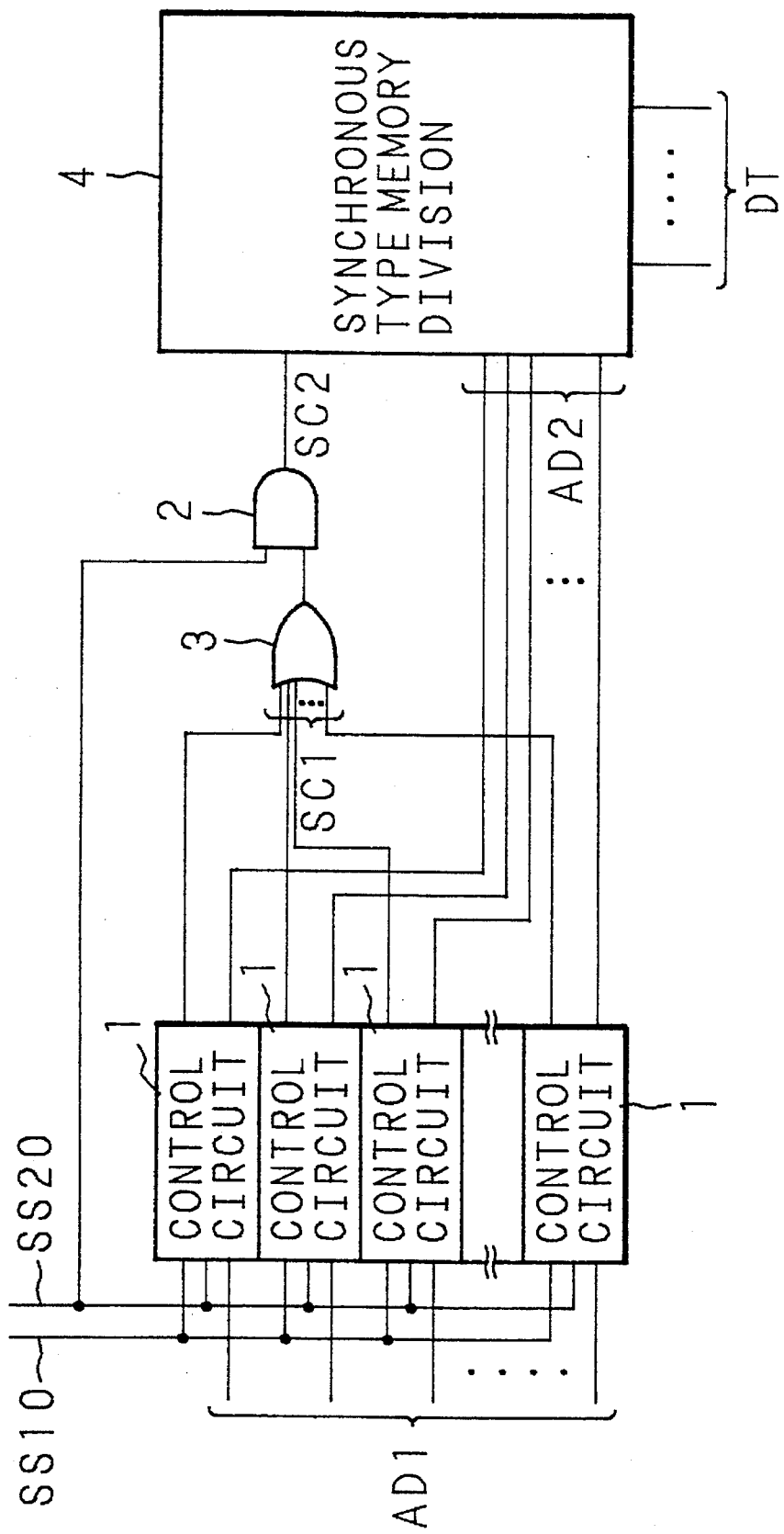
FIG. 1 is a block diagram showing the structure of a known semiconductor integrated circuit including a synchronous type memory division.
Figure 2:
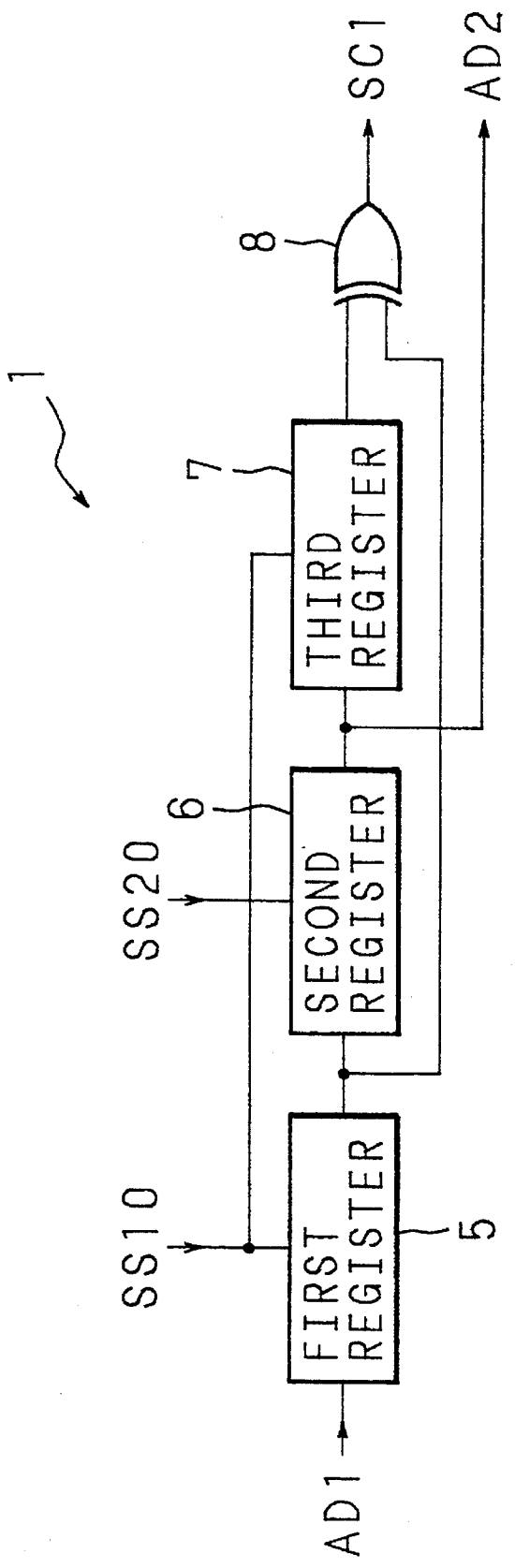
FIG. 2 is a block diagram showing the internal structure of the control circuit shown in FIG. 1.
Figure 3:
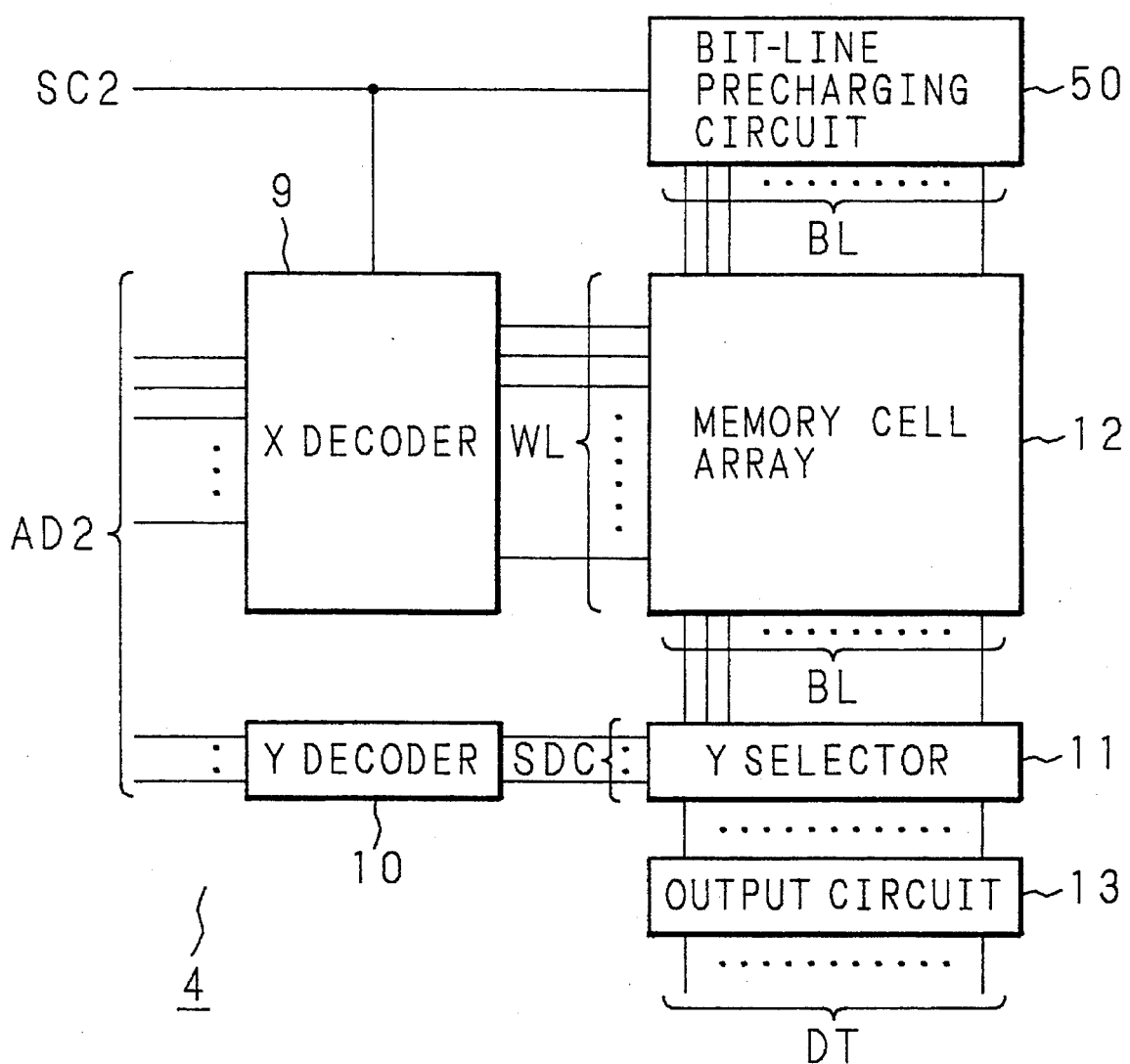
FIG. 3 is block diagram showing the internal structure of the synchronous type memory division shown in FIG. 1.
Figure 4:
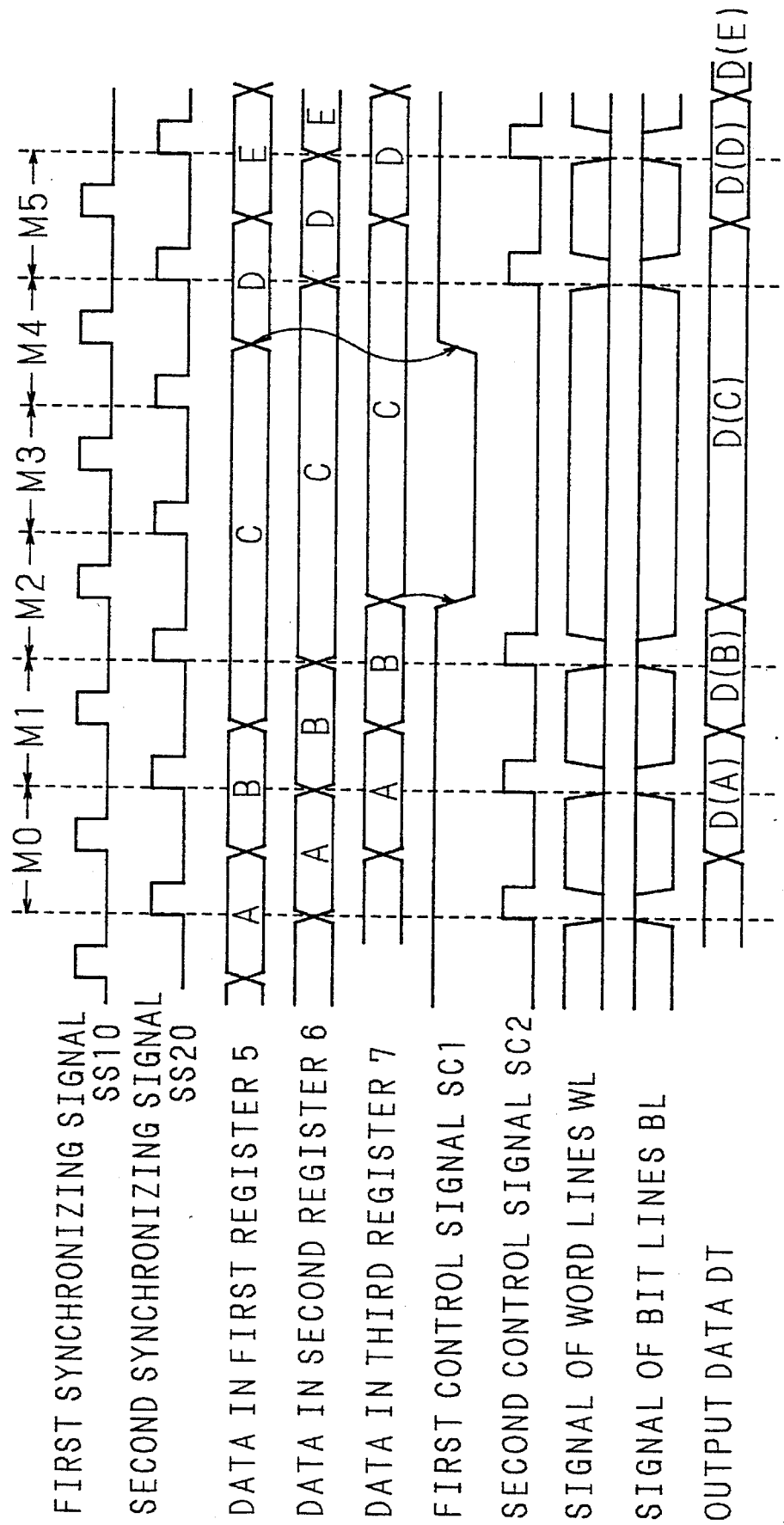
FIG. 4 is a timing diagram showing the operations of the known semiconductor integrated circuit.
Figure 5:
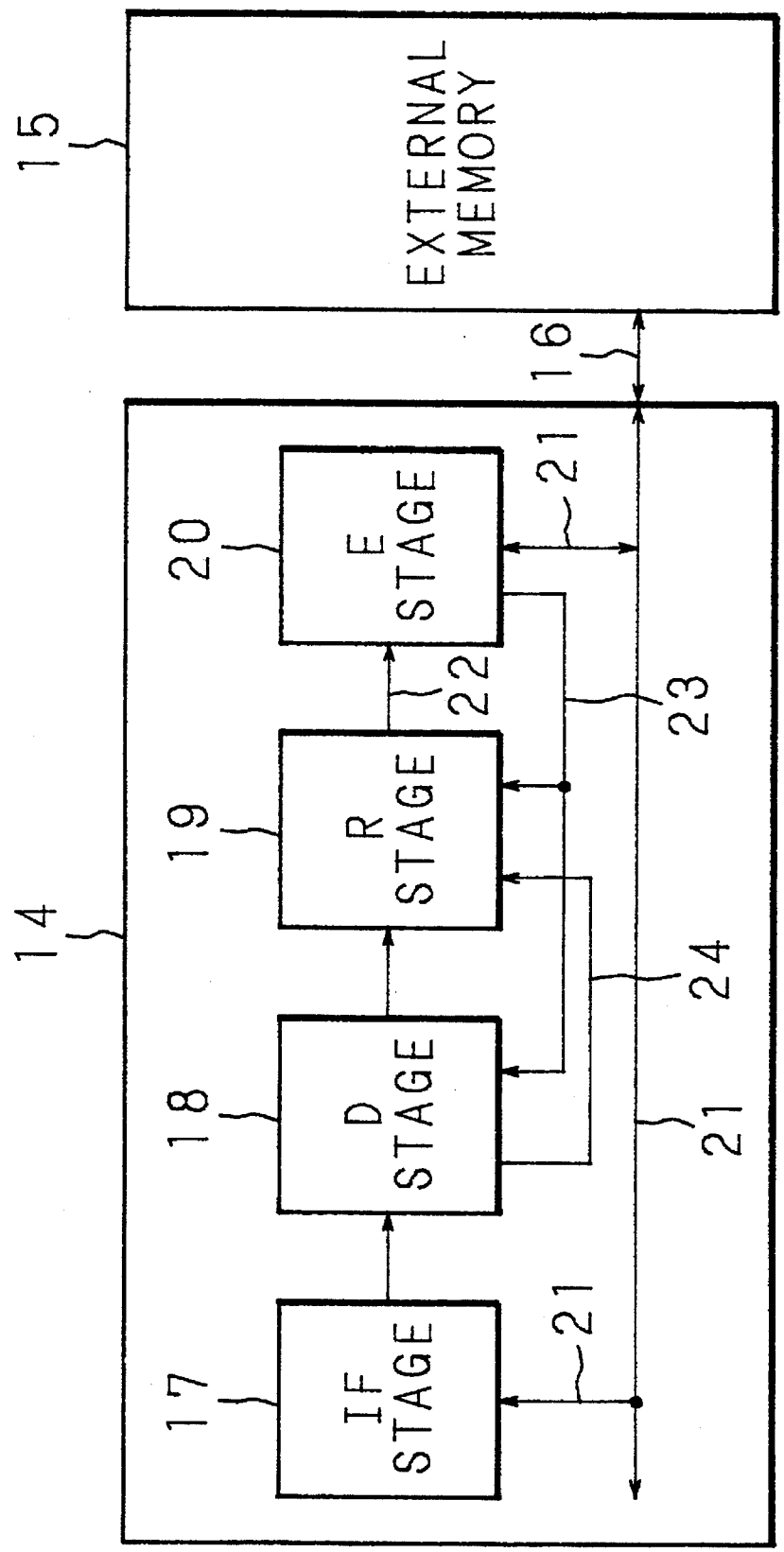
FIG. 5 is a block diagram showing the structure of a semiconductor integrated circuit embodying the present invention.

The following describes the preferred embodiments of the present invention with reference to the accompanying drawings:

FIG. 5 is a block diagram showing the structure of a semiconductor integrated circuit of the present invention. The exemplary semiconductor integrated circuit (hereinafter referred to as "semiconductor IC") 14 is connected to an external memory 15 through an external bus 16 so as to effect mutual communication of instructions and data therebetween. The Semiconductor IC 14 includes an IF stage 17, a D stage 18, an R stage 19 and an E stage 20. The IF stage 17 fetches from the external memory 15 an instruction to be executed in the Semiconductor IC 14, and the D stage 18 decodes the instruction fetched by the IF stage 17. The R stage 19 includes a synchronous type memory division such as a μ ROM, and reads data from the synchronous type memory division by making the result of the decoding at the D stage 18 as an address, thereby generating a control signal 22 for controlling an execution stage described below to the E stage 20. The E stage 20 includes an arithmetic unit whereby the instruction is executed, and outputs an external bus access signal 23 to the D stage 18 and R stage 19. The internal bus 21 is provided in the Semiconductor IC 14 so as to transfer instruction codes from the external memory 15 to the IF stage 17 and also the results of execution and operands between the E stage 20 and the external memory 15. The D stage also outputs a signal 24 invalidating the decoded result to the R stage 19.

Figure 6:
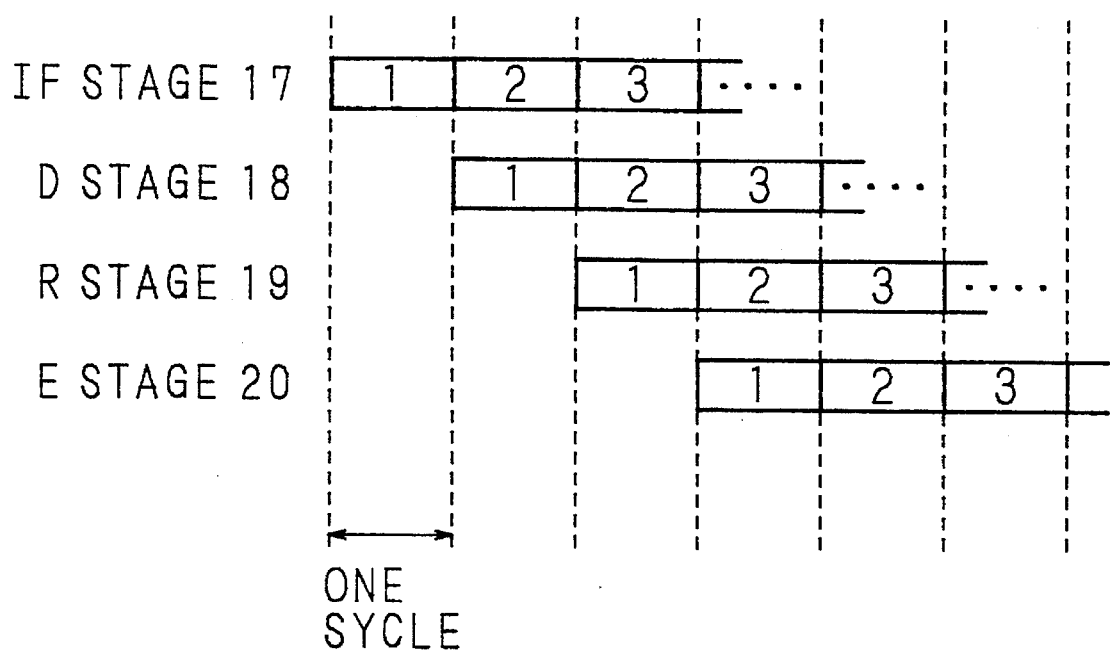
FIG. 6 is a timing diagram showing the operations of the pipe line shown in FIG. 5.

The sequence of executing an instruction in the Semiconductor IC 14 shown in FIG. 5 will be described, where the cycle means one machine cycle:

An instruction to be executed by the Semiconductor IC 14 is fetched from the external memory 15 through the external bus 16 and the internal bus 21, and stored in the IF stage 17. In the next cycle the instruction fetched at the IF stage 17 is transferred to the D stage 18, and is decoded. The result of the decoding is stored. In the next cycle the result of the decoding stored in the D stage is transferred to the R stage 19, and data is read from the synchronous type memory division and stored. In the next cycle the control signal 22 generated on the basis of the data read from the synchronous type memory division of the R stage 19 controls the arithmetic unit provided at the E stage 20 so as to execute the arithmetical operation in accordance with the instruction. The results of execution at the E stage 20 is written in the internal register or alternatively in the external memory 15 through the internal bus 21 and the external bus 16. This example takes at least a period of time in terms of four cycles from the fetching of an instruction up to the writing of the result of the executed instruction. Since this is performed as a pipeline operation, the result of an executed instruction is outputted at each cycle from the E stage 20, which will be more particularly described below:

In FIG. 6, which shows the pipeline operation of the semiconductor IC 14, the numbers 1 to 4 indicate the 1st order, 2nd order and so on being executed at each stage, and each of the divisions defined by dotted lines indicates one cycle. As described above, four cycles are required for the 1st instruction to be fetched into the IF stage 17 and executed at the E stage 20. The IF stage 17 is operated so as to transfer the 1st instruction to the D stage 18, and fetch the 2nd instruction from the external memory 15 at the same time. Each stage is operated in this way, and it will be understood from it that the stage E 20 outputs the results of instruction execution cycle by cycle.

In operating the semiconductor IC 14 with the low consumption of electricity, there is a case where the E stage 20 requires two or more cycles before access to the external bus is finished. In this case, how the synchronous type memory division (μ ROM) provided on the R stage 19 is operated will be described:

A main reason why the access to the external bus is not finished in one cycle is that the external memory 15 engaged in reading and writing an operand required to execute an instruction and write the result of the execution is a low-speed device such as a dynamic RAM.

Figure 7:
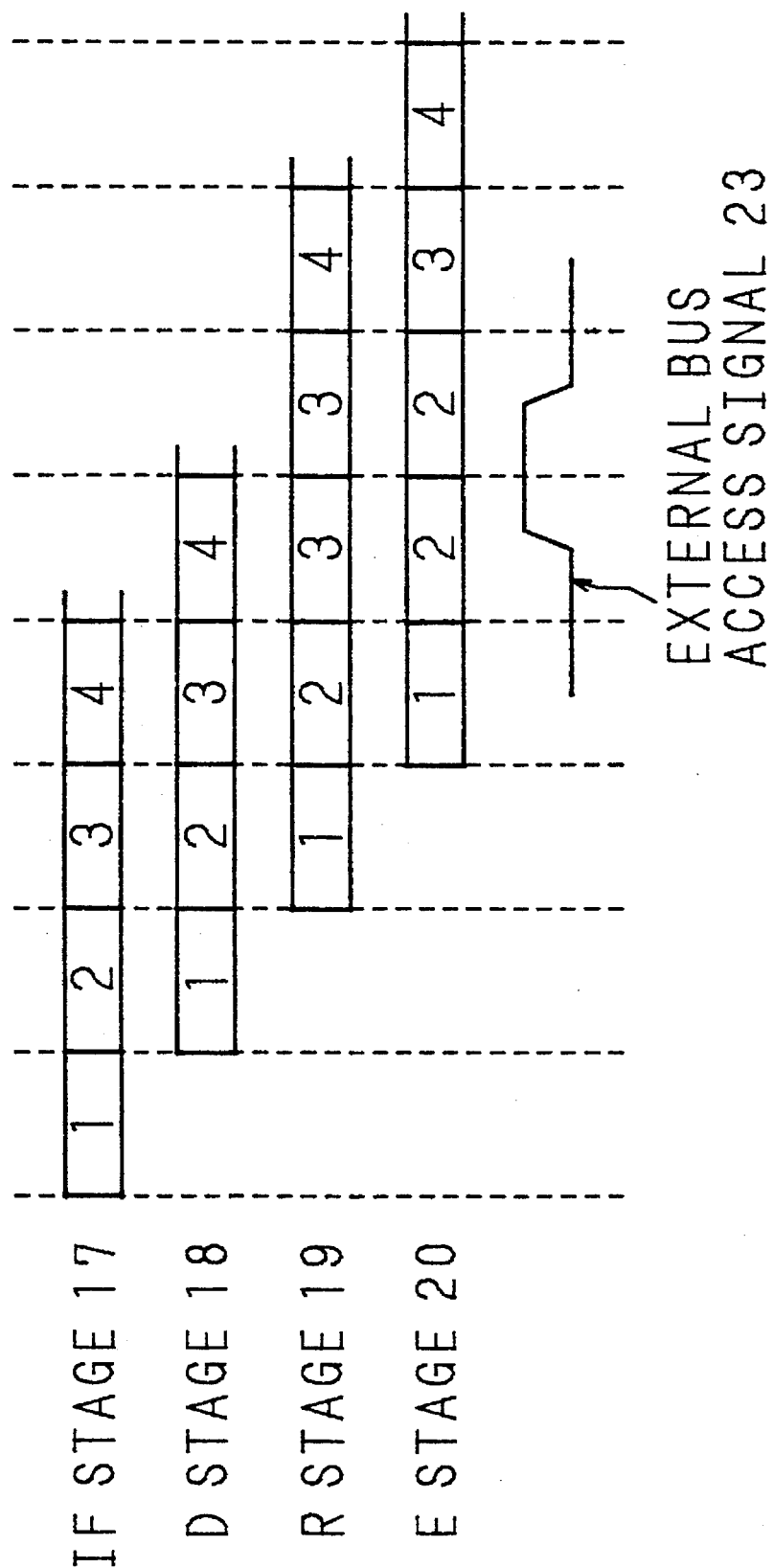
FIG. 7 is a timing diagram showing the operation of the semiconductor integrated circuit in a case where an external bus access effected by the E stage shown in FIG. 5 requires two cycles.
Figure 8:
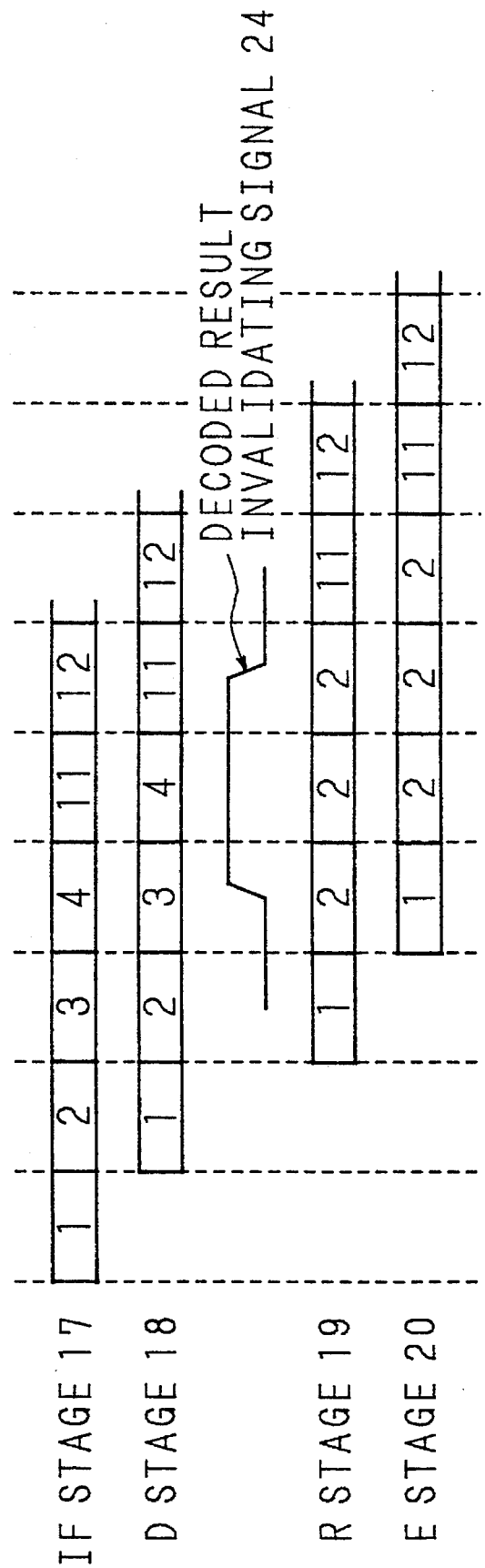
FIG. 8 is a timing diagram showing the operation of the semiconductor integrated circuit in a case where an instruction decoded in the D stage shown in FIG. 5 is a branch instruction.

As shown in FIG. 7, the 2nd instruction starts an access to the external bus in the E stage 20, thus requiring two cycles before the accessing is finished. In this case, the E stage 20 outputs an external bus access signal 23 (H-level) to the R stage 19 with the timing shown in FIG. 7, and requests the R stage 19 not to renew the output content of the control signal 22 until the access to the external bus is finished and the E stage 20 is transferred to the next stage of executing an instruction. The R stage 19 continues to output the control signal 22 in accordance with the 3rd instruction in response to a request by an assert (H-level) of the external bus access signal 23. In this way the semiconductor IC 14 prohibits the synchronous type memory division built in the R stage 19 from reading a new data so that the control signal 22 corresponding to the 3rd instruction already read out may not be changed during a period of time when the external bus access signal 23 is asserted. The E stage 20 continues to execute the 2nd instruction for a period of time when the external bus access signal 23 is outputted. In this example, the control signals of the pipe-line used in executing instructions are used as an external bus access signal 23, and the semiconductor IC 14 is constructed such that the synchronous type memory division in the R stage 19 is prohibited from reading a new data of the synchronous type memory division. Unlike the conventional semiconductor IC the circuit 14 requires no comparator for comparing the memory addresses of the former cycle and the current cycle, or no register for storing the memory address of the former cycle. The operation of the R stage 19 will be more particularly described below:

How the synchronous type memory division (μ ROM) in the R stage 19 is operated when the disturbance (crashing) of the pipeline occurs in executing a branch instruction:

FIG. 8 shows a case where an instruction decoded at the D stage 18 is a branch instruction when the semiconductor IC 14 performs a pipeline operation. Each stage 17 to 20 handles instructions which are designated by reference numerals 1 to 4, 11 and 12. Now, suppose that the 2nd instruction is a branch instruction, and jumps to the 11th instruction. This fact is not known until the sequence proceeds to the D stage 18, and when it is known, the previous IF stage 17 finishes fetching the 3rd and 4th instructions. As a result, when the programmer designates a sequence of instructions 1→2→11, the actual sequence of instructions through the pipeline is 1→2→3→4→11. Even if the 3rd and 4th instructions are executed at the E stage 20, the result of execution is invalid, thereby making a control signal 22 outputted by the R stage 19 to the E stage 20 invalid. Therefore, it is not necessary for the R stage 19 to read any data so as to generate the control signal 22. In this example, by taking advantage of the period of time when the data read from the R stage 19 on the basis of the invalid instruction is transferred to the E stage 20, the D stage 18 asserts (H level) a decoded result invalidating signal (hereinafter referred to as "invalidating signal") 24, and while the signal 24 is asserted to the synchronous type memory division built in the R stage 19, the stage 19 is prohibited from reading any fresh data, and the control signal 22 delivered from the R stage 19 in accordance with the 2nd instruction has a constant value.

Figure 9:
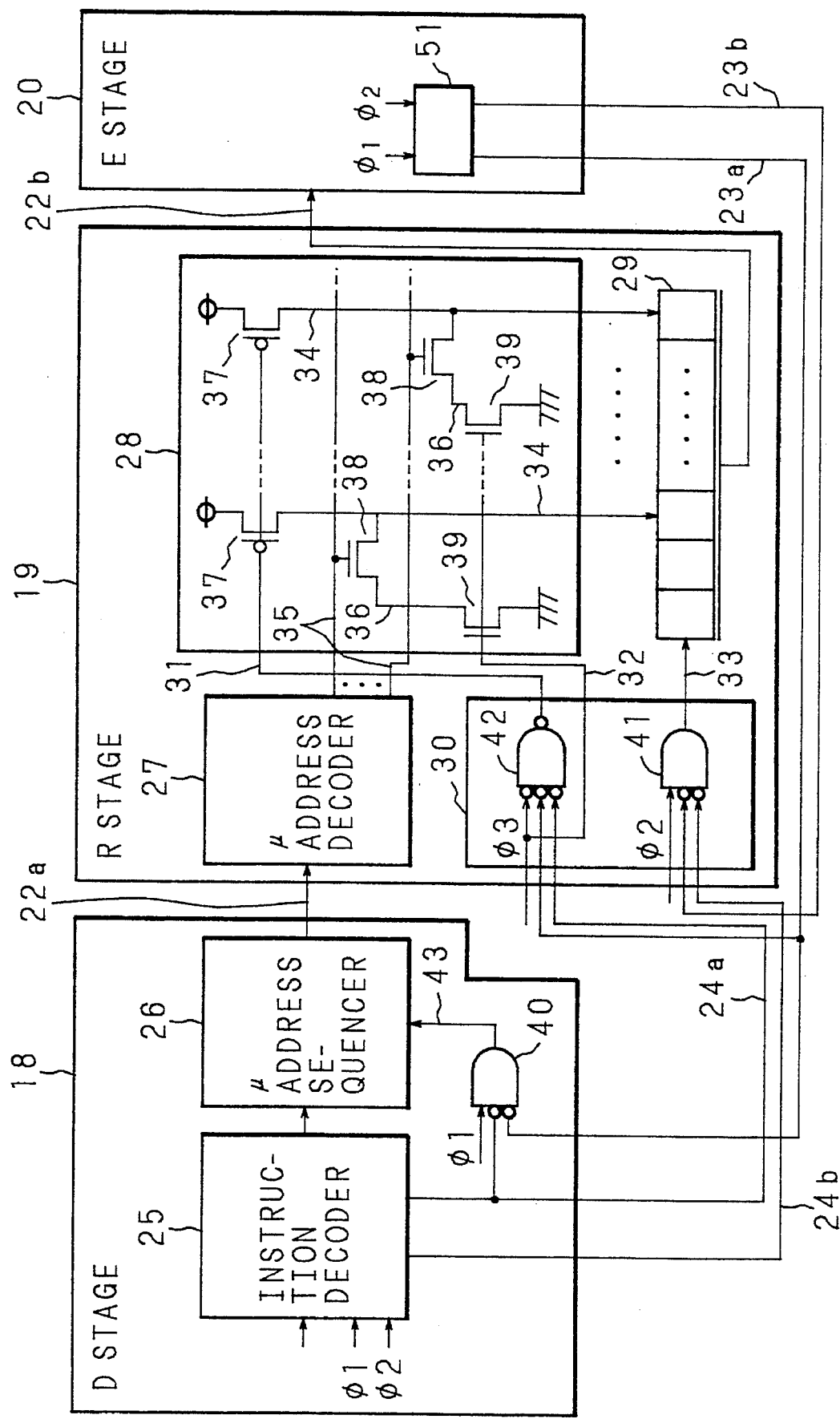
FIG. 9 is a circuit diagram showing the internal structure of the R stage shown in FIG. 5.

FIG. 9 is a circuit diagram showing the structures of the D stage 18 and R stage 19 shown in FIG. 5. The D stage 18 includes an instruction decoder 25, a μ address sequencer 26 and AND gate 40, and receives an instruction outputted from the IF stage 17, and stores the decoded result obtained by the instruction decoder 25 as an address for reading the synchronous type memory division at the μ address sequencer 26. The R stage 19 includes a μ address decoder 27, a synchronous type memory division (hereinafter referred to as "μ ROM 28"), a μ ROM output latch 29 and a μ ROM control circuit 30, and outputs a control signal 22*b* controlling an arithmetic unit on the E stage to the E stage 20. The μ ROM 28 will be described below.

The external bus access signals 23*a* and 23*b* are outputted from the E stage 20 to the D stage 18 and the R stage 19. The external bus access signal 23*a* is outputted synchronizing with a second synchronizing signal φ 2 from the E stage 20 to the D stage 18 and R stage 19. The external bus access signal 23*b* is outputted to the R stage 19 synchronously with a first synchronizing signal φ 1. The first synchronizing signal φ 1, the second synchronizing signal φ 2, and the third synchronizing signal φ 3 are generated on the basis of a basic clock φ (not shown) inputted to the semiconductor IC 14. The invalidating signals 24*a* and 24*b* are outputted from the D stage 18 to the R stage 19. The invalidating signal 24*a* is outputted to the R stage 19 synchronously with the second synchronizing signal φ 2, and the invalidating signal 24*b* is outputted to the R stage 19 synchronously with the first synchronizing signal φ 1. If a bus interface division 51 judges that the access to the external bus is not finished in one cycle, the external bus access signals 23*a* and 23*b* become H-level synchronously with the first synchronizing signal φ 1 and the second synchronizing signal φ 2, and are outputted to the R stage 19 and the D stage 18. The external bus access signals 23*a* and 23*b* can cause a busy signal generated in an interface division 51 to be generated synchronously with the first synchronizing signal φ 1 and the second synchronizing signal φ 2.

The invalidating signals 24*a* and 24*b* become H-level and are outputted synchronously with the first synchronizing signal φ 1 and the second synchronizing signal φ 2 when an instruction outputted by the IF stage 17 to the D stage 18 is decoded by the instruction decoder 25 described below and is judged as an invalid instruction. The invalidating signals 24*a* and 24*b* are generated on the basis of valid and invalid information produced at the IF stage 17. The IF stage 17 finishes fetching in response to the generation of a branch instruction, and transfers an instruction stored in a instruction cue, etc. with the addition of an invalid information to the D stage 18. The instruction freshly fetched from the branch division is delivered to the D stage 18 with the addition of a valid information. The instruction decoder 25 in the D stage 18 generates the invalidating signals 24*a* and 24*b* synchronously with the first synchronizing signal φ 1 and the second synchronizing signal φ 2, in accordance with the invalid information affixed to the instruction from the IF stage 17.

FIG. 9 shows the internal structure of the φ ROM 28. A bit line 34 and a word line 35 are selected by the μ address decoder 27. The reference numeral 36 denotes a ground line for the μ ROM 28. A precharge transistor 37 of the bit line 34 is composed of a P-channel MOS transistor, and precharges the bit line 34 in response to a precharge signal 31 inputted by the μ ROM control circuit 30. A memory cell 38 of the μ ROM 28 is composed of an N-channel MOS transistor, and is provided at the junction of the bit line 34 and the word line 35. A discharge transistor 39 composed of an N-channel transistor discharges the bit line 34 in response to a discharge signal 32 inputted by the μ ROM control circuit 30.

The μ address decoder 27 receives a control signal 22a from the μ address sequencer 26, and selects an appropriate word line 35 corresponding to the μ ROM 28 in response to the control signal 22a. The μ ROM 28 stores a data which indicates the contents to be handled at the E stage 20. The result of the reading from the μ ROM 28 is stored at a μ ROM output latch 29. The μ ROM control circuit 30 controls the precharging and discharging of the μ ROM 28 and the μ ROM output latch 29. The μ ROM control circuit 30 outputs a precharging signal and a discharging signal to the μ ROM 28, and controls the precharging and discharging of the bit line 34. The μ ROM control circuit 30 outputs an input clock signal 33 to the μ ROM output latch 29, and controls the storing of data delivered to the μ ROM output latch 29 from the μ ROM 28.

The AND gate 40 in the D stage 18 receives the first synchronizing signal φ 1, the external bus access signal 23*a* and the invalidating signal 24*a*, and generates an input clock 43 for the μ address sequencer 26. When the input clock 43 is asserted, a fresh decoded result from the instruction decoder 25 is not inputted to the μ address sequencer 26, and is continued to output a decoded result in the previous cycle currently stored. For example, it may be arranged such that it can be determined whether a fresh decoded result from the instruction decoder 25 in accordance with the value of the input clock 43 is fetched into the μ address sequencer 26.

The AND gate 41 in the R stage 19 receives the second synchronizing signal φ 2, the external bus access signal 23*b* and the invalidating signal 24*b*, and generates an input clock signal 33. The AND gate 42 receives the third synchronizing signal φ 3, the external bus access signal 23*a*, and the invalidating signal 24*a*, and generates the precharge signal 31. The μ ROM 28 includes the word lines 35, the bit lines 34 and the memory cells 38 in a known manner, and therefore, the description of it is omitted for simplicity.

Referring to FIG. 10, which is a timing diagram showing the sequence of operation, the operation of the semiconductor IC 14 shown in FIG. 9 is described:

In the D stage 18 the instruction decoder 25 decodes an instruction, and a part of the decoded result is fetched into the μ address sequencer 26 in accordance with the first synchronizing signal φ 1. The external bus access signal 23a and the invalidating signal 24a are at L-level, and the first synchronizing signal φ 1 is at H-level. The input clock 43 from the AND gate 40 to the μ address sequencer 26 is at H-level. While the third synchronizing signal φ 3 is at L-level, the precharging signal outputted by the AND gate 42 becomes L-level, and the precharging transistor 37 is turned on. As a result, the bit line 34 is charged up to the source voltage level.

The control signal 22a indicating an address signal outputted to the μ address decoder 27 is immediately decoded, and one of the word lines 35 becomes H-level. When the word line 35 becomes H-level, the N-channel transistor constituting the memory cell 38 is turned on, thereby enabling the bit line 34 and the ground line 36 to pass an electric current.

Then, when the 3rd synchronizing signal φ 3 becomes H-level, the precharging transistor 37 which precharged the bit line 34 is turned off, and the discharging transistor 39 is turned on, thereby enabling the bit line 34 and the ground to pass an electric current. As a result, the potential which charged up the bit line 34 flows into the ground, and the potential in the bit line 34 becomes a ground level.

When the 2nd synchronizing signal φ 2 becomes H-level, the input clock signal 33 outputted from the AND gate 41 becomes H-level because the external bus access signal 23b and the invalidating signal 24b remain L-level, thereby ensuring that the potential in the bit line 34 (L-level) is fetched into the μ ROM output latch 29. In the bits where the memory cell 38 is not arranged, no current is passed through the bit lines 34 and the ground line 36, thereby leaving the bit lines 34 charged up. As a result, the fetched value in the μ ROM output latch 29 becomes H-level. The μ ROM output latch 29 latches data when the input clock signal 33 is at H-level. The data read from the μ ROM 28 which is fetched into the μ ROM output latch 29 is outputted to the E stage 20 as the control signal 22b so as to use to control the arithmetic unit. The μ ROM 28 built in the R stage 19 reads data in the aforementioned manner.

Referring to FIG. 7, the operation of the E stage 20 will be described, where the E stage executes the 2nd instruction and starts the external bus access to the external memory 15, requiring two cycles to complete the access:

In FIG. 7, at the moment when the E stage 20 executes the 2nd instruction, the μ ROM output latch 29 in the R stage 19 stores data from the μ ROM 28 about the 3rd instruction. In the D stage 18 the 4th instruction is decoded by the instruction decoder 25, and the decoded result is partly stored by the μ address sequencer 26. In this example, three kinds of synchronizing signals φ 1, φ 2 and φ 3 are used, and their waveforms are shown in FIG. 10. The 1st synchronizing signal φ 1 controls the μ address sequencer 26 to store the decoded result, the 2nd synchronizing signal φ 2 controls the μ ROM output latch 29 to latch data from the μ ROM 28, and the 3rd control signal φ 3 controls the switching between the precharging and discharging of the bit lines 34. The synchronizing signals φ 1, φ 2 and φ 3 continue to be oscillated and inputted to the semiconductor IC 14. Normally, the invalidating signals 24a and 24b are L-level. In the following description the ordinal numbers denoting clocks indicate the positions of pulses from the left-hand edge in FIG. 10.

In the E stage 20, upon starting to execute the 2nd instruction, the external bus access signal 23a becomes H-level synchronously with the rise of the 2nd synchronizing signal φ 2; more specifically, the rise of the 4th clock of the 2nd synchronizing signal φ 2 to H-level. In this case, even if the 3rd synchronizing signal φ 3 become L-level, the precharging signal 31 from the AND gate 42 of the μ ROM control circuit 30 remains at H-level because the external bus access signal 23a is at H-level. As a result, the bit line 34 does not rise to the source voltage level. The external bus access signal 23a remains at H-level until the bus access is finished, this term corresponding to one cycle of the 2nd synchronizing signal φ 2. Since the external bus access signal 23a is at H-level. In the μ address sequencer 26, the decoded result of the 4th instruction is not held with the 4th clock of the 1st synchronizing signal φ 1 at H-level. As a result, the value of the control signal 22a outputted from the μ address sequencer 26 remains the same as the decoded result of the 3rd instruction.

At the time the 4th clock of the 2nd synchronizing signal φ 2 falls to L-level, the 4th clock of the 1st synchronizing signal φ 1 rises to H-level. The external bus access signal 23b becomes H-level synchronously with the 1st synchronizing signal φ 1. The external bus access signal 23b remains at H-level during one cycle of the 1st synchronizing signal φ 1. Consequently, even if the 5th clock of the 2nd synchronizing signal φ 2 becomes H-level, the input clock signal 33 outputted from the AND gate 41 of the μ ROM control circuit 30 becomes L-level because the external bus access signal 23b remains at H-level, thereby preventing the μ ROM output latch 29 from fetching a fresh data from the μ ROM 28. Because of fetching no fresh data from the μ ROM 28, the data about the 3rd instruction which was fetched from the μ ROM 28 in the previous cycle is stored at the μ ROM output latch 29. At the R stage 19 the data about the 3rd instruction from the μ ROM 28 is outputted as the control signal 22b from the μ ROM output latch 29 to the E stage 20, wherein the data is the same as that handled in the previous cycle. At the E stage 20 the 2nd instruction is executed in the same manner as in the previous cycle. After at the E stage 20 the external bus access is executed in two cycles with respect to the 2nd instruction, at the D stage 18 the 5th clock of the 1st synchronizing signal φ 1 rises to H-level, thereby holding the decoded result of the 4th instruction at the μ address sequencer 26 and outputting it to the R stage 19. The subsequent operations of the R stage 19 and E stage 20 with respect to the 4th instruction are the same as described before. The description of it will be omitted for simplicity.

The following describes a case where in executing a branch instruction no fresh data is read from the μ ROM 28 of the R stage 19 on the basis of the invalid instruction fetched at the IF stage 17. In FIG. 10, the 6th instruction is a branch instruction, and the 11th instruction is an instruction to be branched. At the IF stage 17 the 4th, 5th, 6th, 7th, 8th and 11th instructions are fetched from the external memory 15 in this order (not shown). Herein the 7th and 8th instructions are invalid. The 6th instruction is decoded at the D stage, from which it will be understood that it is a branch instruction. When the 6th instruction is decoded at the D stage 18, the 7th instruction, which is invalid at the IF stage, is fetched from the external memory 15. The decoded result of the 6th instruction is outputted from the D stage 18 to the R stage 19, and at the IF stage 17 the 8th instruction is fetched, and the 7th instruction is outputted from the IF stage 17 to the D stage 18.

At the R stage 19 the 6th instruction is executed to read the μ ROM 28. When the 3rd synchronizing signal φ 3 (the 7th L-level), the external bus access signal 23a and the invalidating signal 24a are at L-level, the precharging signal 31 outputted from the AND gate 42 of the μ ROM control circuit 30 becomes L-level, thereby turning on the precharging transistor 37, and charging up the bit lines 34 to the source voltage level. The rising of the 3rd synchronizing signal φ 3 to H-level turns on the discharging transistor 39. As a result, the bit lines 34 connected to the corresponding memory cell 38 become L-level.

Subsequently, since the 8th clock of the 2nd synchronizing signal φ 2 rises at H-level, and the external bus access signal 23b and the invalidating signal 24b become L-level, the input clock signal 33 outputted from the AND gate 41 of the μ ROM control circuit 30 becomes H-level, thereby latching the data about the 6th instruction from the μ R ROM 28 at the μ ROM output latch 29. The latched data is outputted to the E stage 20 as the control signal 22b.

At the same time, since at the D stage 18 the invalidating signal 24a becomes H-level synchronously with the rising of the 8th clock of the 2nd synchronizing signal φ 2, the input clock 43 at L-level is outputted to the μ address sequencer 26 from the AND gate 43. The period of time when the invalidating signal 24a remains at H-level corresponds to one cycle of the 2nd synchronizing signal φ 2. Normally, the decoded result of the 7th instruction obtained at the instruction decoder 25 is held at the μ address sequencer 26 synchronously with the rising of the 8th clock of the first synchronizing signal φ 1, but actually the decoded result of the invalid 7th instruction is not held at the μ address sequencer 26 because of the input clock 43 being at L-level. The μ address sequencer 26 continues to hold the decoded result of the 6th instruction obtained in the previous cycle. At this time the 8th instruction is decoded by the instruction decoder 25 in the D stage 18. The 11th instruction is fetched to the IF stage 17.

Then, the 8th clock of the 2nd synchronizing signal φ 2 becomes L-level, and the 8th clock of the 1st synchronizing signal φ 1 rises to H-level and the 3rd synchronizing signal φ 3 falls to L-level. While the 3rd synchronizing signal φ 3 is at L-level, the invalidating signal 24a becomes H-level. As a result, the precharging signal 31 from the AND gate 42 becomes H-level, and the bit lines 34 are not charged up to the source voltage level. The invalidating signal 24b becomes H-level synchronously with the 8th clock of the 1st synchronizing signal φ 1 rising to H-level, wherein the invalidating signal 24b remains at H-level for a period of time corresponding to one cycle of the 1st synchronizing signal φ 1.

Although the 8th clock of the 1st synchronizing signal φ 1 falls to L-level, and the 9th clock of the 2nd synchronizing signal φ 2 rises to H-level, the input clock signal 33 outputted from the AND gate 41 remains at L-level because the invalidating signal 24b is at H-level, thereby inputting no fresh data to the μ ROM output latch 29. As a result, the R stage 19 outputs no fresh data but the data held at the μ ROM output latch 29 about the 6th instruction as the control signal 22b to the E stage 20.

In the D stage 18 the instruction decoder 25 decodes the 8th instruction. As a result, when it is detected that the 8th instruction is invalid, the invalidating signal 24a is raised to H-level synchronously with the 9th clock of the 2nd synchronizing signal φ 2 rising to H-level, wherein the invalidating signal 24a remains at H-level for a period of time corresponding to one cycle of the 2nd synchronizing signal φ 2.

Synchronously with the 9th clock of the 2nd synchronizing signal φ 2 becoming L-level, and the 9th clock of the 1st synchronizing signal φ 1 rising to H-level, the invalidating signal 24b is raised to H-level, wherein the invalidating signal 24b remains at H-level for a period of time corresponding to one cycle of the 1st synchronizing signal φ 1.

When the 9th clock of the 1st synchronizing signal φ 1 becomes H-level, in the D stage 18 the decoded result of the invalid 8th instruction is not inputted to the μ address sequencer 26 in the same manner as described with respect to the 7th instruction, and in the R stage 19 the bit lines 34 are not charged up to the source voltage level on the basis of the L-level of the 3rd synchronizing signal φ 3, and even when the 10th clock of the 2nd synchronizing signal φ 2 becomes H-level, no fresh data is inputted to the μ ROM output latch 29.

In this way, a data about the 6th instruction is outputted as the control signal 22b from the R stage 19 to the E stage 20. In the D stage 18 the 11th instruction to be jumped to is decoded, and when the instruction decoder 25 judges that the 11th instruction is valid, the invalidating signals 24a and 24b are not raised to H-level. The 11th instruction is latched at the μ address sequencer 26 synchronously with the rise of the 10th clock of the 1st synchronizing signal φ 1, and is outputted to the R stage 19. The operations in the R stage 19 are executed in the same manner as described with respect to the 6th instruction, and a data about the 11th instruction is outputted to the E stage 20 as the control signal 22b.

As described above, in a case where the external bus access is started in the E stage 20 and two or more cycles are required before the access is finished, by using the external bus access signals 23a and 23b from the E stage 20, a fresh data is prohibited from being read from the μ ROM 28, thereby outputting the same control signal 22b as that in the previous cycle to the E stage 20 from the R stage 19. As a result, the present invention can dispense with a three-stage register and a comparator in contrast to the known semiconductor integrated circuits wherein they are essential, thereby decreasing the number of hardware and saving electricity.

With respect to the branch instructions, the use of the invalidating signals 24a and 24b from the R stage 19 prohibits a fresh data from being read from the μ ROM 28 on the basis of an invalid instruction at the R stage 19. In this way, the present invention can dispense with the step of comparing addresses which is required in the known semiconductor integrated circuits, thereby avoiding the waste of electricity which unavoidably results from the comparison of addresses. In contrast to the known semiconductor integrated circuits where a three-stage register and a comparator are used to precharge in accordance with the results of comparison between the memory addresses in the previous cycle and the present cycle, according to the present invention the precharge control division controls the generation and restraint of precharge request signals on the basis of the first and second prohibiting signals outputted from the execution stage or the decoding stage, thereby decreasing the number of hardware and the consumption of electricity which would increase owing to the execution of unnecessary precharges.

Even when, while the decoded results of instructions are invalid, an address for access to a synchronous type memory division in the previous cycle is different from that in the present cycle, the 2nd prohibiting signal outputted from the decoding stage prevents the invalid synchronous type memory division from precharging.

When the precharging of the synchronous type memory division is stopped by controlling the 1st latch renewal permitting signal and the 2nd latch renewal permitting signal, the 1st and 2nd latch divisions no longer latch the output data of the synchronous type memory division and the decoded result, and continue to output the data currently held to the instruction execution division and the instruction execution control division. As a result, the synchronous type memory division and the instruction decoding division can be constructed with a dynamic with less hardware.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A semiconductor integrated circuit comprising:
   an instruction decoding division for decoding an instruction;
   an instruction execution controlling division for generating a control signal controlling the execution of the instruction on the basis of the result decoded by the instruction decoding division; and
   an instruction executing division for executing the instruction on the basis of the control signal but for generating a prohibiting signal when no preparation is made for receiving the control signal;
   wherein the instruction execution controlling division includes:
      a precharge control division for generating a precharge request signal but for stopping the generation of the precharge request signal in response to the prohibiting signal delivered from the instruction executing division; and
      a synchronous type memory division including word lines selectable in accordance with the decoded result, bit lines, a precharge circuit for precharging a selected bit line in response to the precharge request signal, a ground line through which the precharged bit line is discharged, and a memory cell for generating the control signal, the memory cell being connected to the word lines, the bit lines and the ground line.

2. The semiconductor integrated circuit according to claim 1, wherein the instruction execution controlling division includes:
   a latch control division for generating a latch renewal permitting signal but for stopping the generation of the latch renewal permitting signal in response to the prohibiting signal, and
   a latch division for latching a data read from the synchronous type memory division in response to the latch renewal permitting signal from the latch control division.

3. The semiconductor integrated circuit according to claim 1, wherein the instruction decoding division includes:
   a latch control division for generating a latch renewal permitting signal but for stopping the generation of the latch renewal permitting signal in response to the prohibiting signal, and
   a latch division for latching the decoded result of the instruction in response to the latch renewal permitting signal from the latch control division.

4. The semiconductor integrated circuit according to claim 1, wherein the instruction execution controlling division includes:
   a first latch control division for generating a first latch renewal permitting signal but for stopping the generation of the first latch renewal permitting signal in response to the prohibiting signal; and
   a first latch division for latching a data read from the synchronous type memory division in response to the first latch renewal permitting signal from the first latch control division, and
wherein the instruction decoding division includes:
   a second latch control division for generating a second latch renewal permitting signal but for stopping the generation of the second latch renewal permitting signal in response to the prohibiting signal; and
   a second latch division for latching the decoded result of the instruction in response to the second latch renewal permitting signal delivered from the second latch control division.

5. A semiconductor integrated circuit including:
   an instruction decoding division for decoding an instruction but for generating a prohibiting signal when the decoded result is invalid;
   an instruction execution controlling division for generating a control signal controlling the execution of the instruction on the basis of the result decoded by the instruction decoding division; and
   an instruction executing division for executing the instruction on the basis of the control signal,
   wherein the instruction execution controlling division includes;
      a precharge control division for generating a precharge request signal but for stopping the generation of the precharge request signal in response to the prohibiting signal delivered from the instruction decoding division; and
      a synchronous type memory division including word lines selectable in accordance with the decoded result, bit lines, a precharge circuit for precharging a selected bit line in response to the precharge request signal, a ground line through which the precharged bit line is discharged, and a memory cell for generating the control signal, the memory cell being connected to the word lines, the bit lines and the ground line.

6. The semiconductor integrated circuit according to claim 5, wherein the instruction execution controlling division includes:
   a latch control division for generating a latch renewal permitting signal but for stopping the generation of the latch renewal permitting signal in response to the prohibiting signal, and
   a latch division for latching a data read from the synchronous type memory division in response to the latch renewal permitting signal from the latch control division.

7. The semiconductor integrated circuit according to claim 5, wherein the instruction decoding division includes:
   a latch control division for generating a latch renewal permitting signal but for stopping the generation of the latch renewal permitting signal in response to the prohibiting signal, and
   a latch division for latching the decoded result of the instruction in response to the latch renewal permitting signal from the latch control division.

8. The semiconductor integrated circuit according to claim 5, wherein the instruction execution controlling division includes:

a first latch control division for generating a first latch renewal permitting signal but for stopping the generation of the first latch renewal permitting signal in response to the prohibiting signal; and a first latch division for latching a data read from the synchronous type memory division in response to the first latch renewal permitting signal delivered from the first latch control division, and wherein the instruction decoding division includes:

a second latch control division for generating a second latch renewal permitting signal but for stopping the generation of the second latch renewal permitting signal in response to the prohibiting signal; and a second latch division for latching the decoded result of the instruction in response to the second latch renewal permitting signal from the second latch control division.

9. A semiconductor integrated circuit including:

an instruction decoding division for decoding an instruction but for generating a first prohibiting signal when the decoded result is invalid;

an instruction execution controlling division for generating a control signal controlling the execution of the instruction on the basis of the result decoded by the instruction decoding division; and an instruction executing division for executing the instruction on the basis of the control signal but for generating a second prohibiting signal when no preparation is made for receiving the control signal;

wherein the instruction execution controlling division includes;

a precharge control division for generating a precharge request signal but for stopping the generation of the precharge request signal in response to both the first prohibiting signal delivered from the instruction executing division and the second prohibiting signal delivered from the instruction decoding division; and a synchronous type memory division including word lines selectable in accordance with the decoded result, bit lines, a precharge circuit for precharging a selected bit line in response to the precharge request signal, a ground line through which the precharged bit line is discharged, and a memory cell for generating the control signal, the memory cell being connected to the word lines, the bit lines and the ground line.

10. The semiconductor integrated circuit according to claim 9, wherein the instruction execution controlling division includes:

a first latch control division for generating a first latch renewal permitting signal but for stopping the generation of the first latch renewal permitting signal in response to the first prohibiting signal; and a first latch division for latching a data read from the synchronous type memory division in response to the first latch renewal permitting signal delivered from the first latch control division, and wherein the instruction decoding division includes:

a second latch control division for generating a second latch renewal permitting signal but for stopping the generation of the second latch renewal permitting signal in response to the second prohibiting signal; and a second latch division for latching the decoded result of the instruction in response to the second latch renewal permitting signal from the second latch control division.

11. The semiconductor integrated circuit according to claim 9, wherein the instruction decoding division includes:

a first latch control division for generating a first latch renewal permitting signal but for stopping the generation of the first latch renewal permitting signal in response to the first prohibiting signal; and a first latch division for latching the decoded result of the instruction in response to the first latch renewal permitting signal delivered from the first latch control division, and wherein the instruction execution controlling division includes:

a second latch control division for generating a second latch renewal permitting signal but for stopping the generation of the second latch renewal permitting signal in response to the second prohibiting signal; and a second latch division for latching a data read from the synchronous type memory division in response to the second latch renewal permitting signal delivered from the second latch control division.

* * * * *